United States Patent
Mäenpää

(10) Patent No.: US 10,608,873 B2
(45) Date of Patent: Mar. 31, 2020

(54) METHODS AND DEVICES FOR MEDIA PROCESSING IN DISTRIBUTED CLOUD

(71) Applicant: TELEFONAKTIEBOLAGET L M ERICSSON (PUBL), Stockholm (SE)

(72) Inventor: Jouni Mäenpää, Nummela (FI)

(73) Assignee: Telefonaktiebolaget LM Ericsson (publ), Stockholm (CH)

( * ) Notice: Subject to any disclaimer, the term of this patent is extended or adjusted under 35 U.S.C. 154(b) by 161 days.

(21) Appl. No.: 14/910,514

(22) PCT Filed: Aug. 8, 2013

(86) PCT No.: PCT/SE2013/050956
§ 371 (c)(1),
(2) Date: Feb. 5, 2016

(87) PCT Pub. No.: WO2015/020573
PCT Pub. Date: Feb. 12, 2015

(65) Prior Publication Data
US 2016/0182288 A1  Jun. 23, 2016

(51) Int. Cl.
*H04L 29/06* (2006.01)
*H04L 12/24* (2006.01)
(Continued)

(52) U.S. Cl.
CPC .......... *H04L 41/0806* (2013.01); *H04L 45/24* (2013.01); *H04L 65/60* (2013.01); *H04L 67/10* (2013.01); *H04L 67/1004* (2013.01)

(58) Field of Classification Search
CPC ..................................................... H04L 41/0806
(Continued)

(56) References Cited

U.S. PATENT DOCUMENTS 7,447,815 B2  11/2008  Weaver et al.
9,146,922 B2   9/2015  Guo
(Continued)

FOREIGN PATENT DOCUMENTS

CN     1476558 A     2/2004
CN   101594387 A    12/2009
(Continued)

OTHER PUBLICATIONS

International Search Report and Written Opinion dated Feb. 24, 2014, in International Application No. PCT/SE2013/050956, 10 pages.
(Continued)

*Primary Examiner* — Adnan M Mirza
(74) *Attorney, Agent, or Firm* — Sage Patent Group

(57) ABSTRACT

The teachings relates to methods for media processing performed in a network node of a distributed cloud 11 comprising two or more virtual machines run in a respective distributed data center. The method comprises: receiving a request for a media service between at least a first and a second user device A, B; creating two or more media virtual nodes for handling the media service, the two or more media virtual nodes being run on a respective virtual machine; configuring, for the first user device A participating in the media service, a communication path to the second user device B for a media stream of the media service, the communication path involving the created two or more media virtual nodes and the communication path comprising at least one redundant path section.

25 Claims, 5 Drawing Sheets

(51) Int. Cl.
*H04L 29/08* (2006.01)
*H04L 12/707* (2013.01)

(58) Field of Classification Search
USPC .................................................. 709/220
See application file for complete search history.

(56) References Cited

U.S. PATENT DOCUMENTS

| | | | | |
|---|---|---|---|---|
| 2004/0199662 | A1* | 10/2004 | Karol | H04L 63/0227 709/238 |
| 2012/0084598 | A1* | 4/2012 | Alibakhsh | H04L 67/42 714/4.11 |
| 2013/0014101 | A1* | 1/2013 | Ballani | H04L 67/101 718/1 |
| 2015/0039282 | A1* | 2/2015 | Sylvester | G06F 17/5022 703/13 |
| 2015/0334696 | A1* | 11/2015 | Gu | H04L 67/1095 718/1 |

FOREIGN PATENT DOCUMENTS

| | | |
|---|---|---|
| CN | 101802820 A | 8/2010 |
| CN | 103167034 A | 6/2013 |
| EP | 0963082 A2 | 12/1999 |
| WO | 2010099367 A2 | 9/2010 |

OTHER PUBLICATIONS

Chinese Office Action with Search Report issued in Chinese Application No. 201380079271.4 dated Apr. 28, 2018, 8 pages.
European Communication issued in Application No. 13 756 734.3 dated May 24, 2016, 6 pages.
Communication pursuant to Article 94(3) EPC—EP 13756734.3— dated May 29, 2019—6 Pages.

\* cited by examiner

METHODS AND DEVICES FOR MEDIA PROCESSING IN DISTRIBUTED CLOUD

CROSS REFERENCE TO RELATED APPLICATION(S)

This application is a 35 U.S.C. § 371 National Phase Entry application from PCT/SE2013/050956, filed Aug. 8, 2013, designating the United States, the disclosure of which is incorporated herein in its entirety by reference.

TECHNICAL FIELD

The technology disclosed herein relates generally to the field of distributed cloud environments, and in particular to media processing of e.g. real-time communications in such environments.

BACKGROUND

In a conventional centralized cloud environment, all computing is typically executed in a single large centralized data center. In contrast, a distributed cloud comprises a potentially high number of geographically dispersed data centers instead of only one central data center. These geographically dispersed data centers have different capabilities; some of the data centers may be relatively small and be located at the edge of a network comprising the distributed cloud environment, whereas others may be located at the core of the network and have a very high capacity.

Traditionally, Unified Communications (UC) services, such as multiparty audio and video conferencing, have been provided using dedicated server hardware and Digital Signal Processors (DSPs). Today, there is an increasing trend to migrate hardware-based UC solutions to a fully software-based cloud environment. The first step in this migration is to provide software-based UC services in a centralized cloud environment. The next foreseen step is to provide them in a distributed cloud environment.

FIG. 1 illustrates a simple example of a distributed cloud environment, in the following also referred to as network 1. In the figure, a distributed cloud 2 provides a video conference service for three users A, B, C. Media processing is distributed in the cloud 2 in such a way that each of the users A, B, C is being served by a local Media Resource Function Processor (MRFP) instance 3A, 3B, 3C located close to the user A, B, C at the edge of the network 1. Further, processing such as audio mixing and switching for the video conference is being handled by an MRFP 3 in a large data center at the core of the network 1. Each MRFP instance 3A, 3B, 3C is running in a virtual machine within a respective data center.

A reason for distributing media processing to several virtual machines (i.e. a chain of virtual machines) is that the capacity of a single virtual machine is typically not sufficient for handling the media processing for all the users in a conference. This is especially true for example in a high definition video conference where users are using different codecs and wherein transcoding thus is required.

It is beneficial to distribute the media processing to virtual machines in different data centers since latencies can be minimized and responsiveness maximized when media processing occurs as close to the conference participants as possible. Latencies need to be minimized to improve the quality of the service as experienced by the users.

A distributed cloud environment may thus comprise multiple heterogeneous and geographically dispersed data centers. However, there are also drawbacks of using such distributed cloud environments, and fully software based media processing in the distributed cloud environment faces several challenges. Any virtual machine in the chain of virtual machines that contributes to the distributed processing of media streams in an audio or video call or conference may become overloaded. This may result in high latencies and jitter. The transition network interface→hypervisor→virtual machine at each physical server may result in a high amount of jitter if the physical server is running multiple virtual machines in parallel, which is typically the case. Further, virtual machines as well as physical servers may crash. A data center may lose its connectivity and become unavailable. Further still, the network links connecting the data centers may become congested, which may result in high packet loss, jitter and latencies, among other things.

From the above it is clear that the end-to-end delay, jitter and packet loss of media packets flowing through the distributed cloud can be highly unpredictable. As a result, operators of the network 1 may encounter difficulties in providing an agreed-upon quality of service to their users.

SUMMARY

An object of the present teachings is to overcome or at least alleviate one or more of the above discussed problems.

The object is according to a first aspect achieved by a method for media processing performed in a network node of a distributed cloud. The distributed cloud comprises two or more virtual machines run in a respective distributed data center. The method comprises: receiving a request for a media service between at least a first and a second user device; creating two or more media virtual nodes for handling the media service, the two or more media virtual nodes being run on a respective virtual machine; configuring, for the first user device participating in the media service, a communication path to the second user device for a media stream of the media service, the communication path involving the created two or more media virtual nodes and the communication path comprising at least one redundant path section.

The method introduces redundancy both for media streams and for media processing resources. By means of the method problems such as e.g. unavailability of data centers and congestion are overcome or at least alleviated, in that the redundant paths may provide alternative communication paths for the media streams. The introduction of multiple paths, creating redundancy for the media streams as well as media processing resources, enables high quality of experience, e.g. in terms of low delay, low jitter and low packet losses.

The object is according to a second aspect achieved by a network node for media processing of a distributed cloud. The distributed cloud comprises two or more virtual machines run in a respective distributed data center. The network node comprises a processor and memory, the memory containing instructions executable by the processor, whereby the network node is operative to: receive a request for a media service between at least a first and a second user devices; create two or more media virtual nodes for handling the media service, the two or more media virtual nodes being run on a respective virtual machine; and configure, for the first user device participating in the media service, a communication path to the second user device for a media stream of the media service, the communication path involving the created two or more media virtual nodes and the communication path comprising at least one redundant path section.

Advantages corresponding to the above are achieved.

The object is according to a third aspect achieved by a computer program for a network node of a distributed cloud. The distributed cloud comprises two or more virtual machines run in a respective distributed data center. The computer program comprises computer program code, which, when run on the network node causes the network node to: receive a request for a media service between at least a first and a second user device; create two or more media virtual nodes for handling the media service, the two or more media virtual nodes being run on a respective virtual machine; and configure, for the first user participating in the media service, a communication path to the second user device for a media stream of the media service, the communication path involving the created two or more media virtual nodes and the communication path comprising at least one redundant path section.

Advantages corresponding to the above are achieved.

The object is according to a fourth aspect achieved by a computer program product comprising a computer program as above, and a computer readable means on which the computer program is stored.

Advantages corresponding to the above are achieved.

Further features and advantages of the present teachings will become clear upon reading the following description and the accompanying drawings.

DETAILED DESCRIPTION

Figure 1:
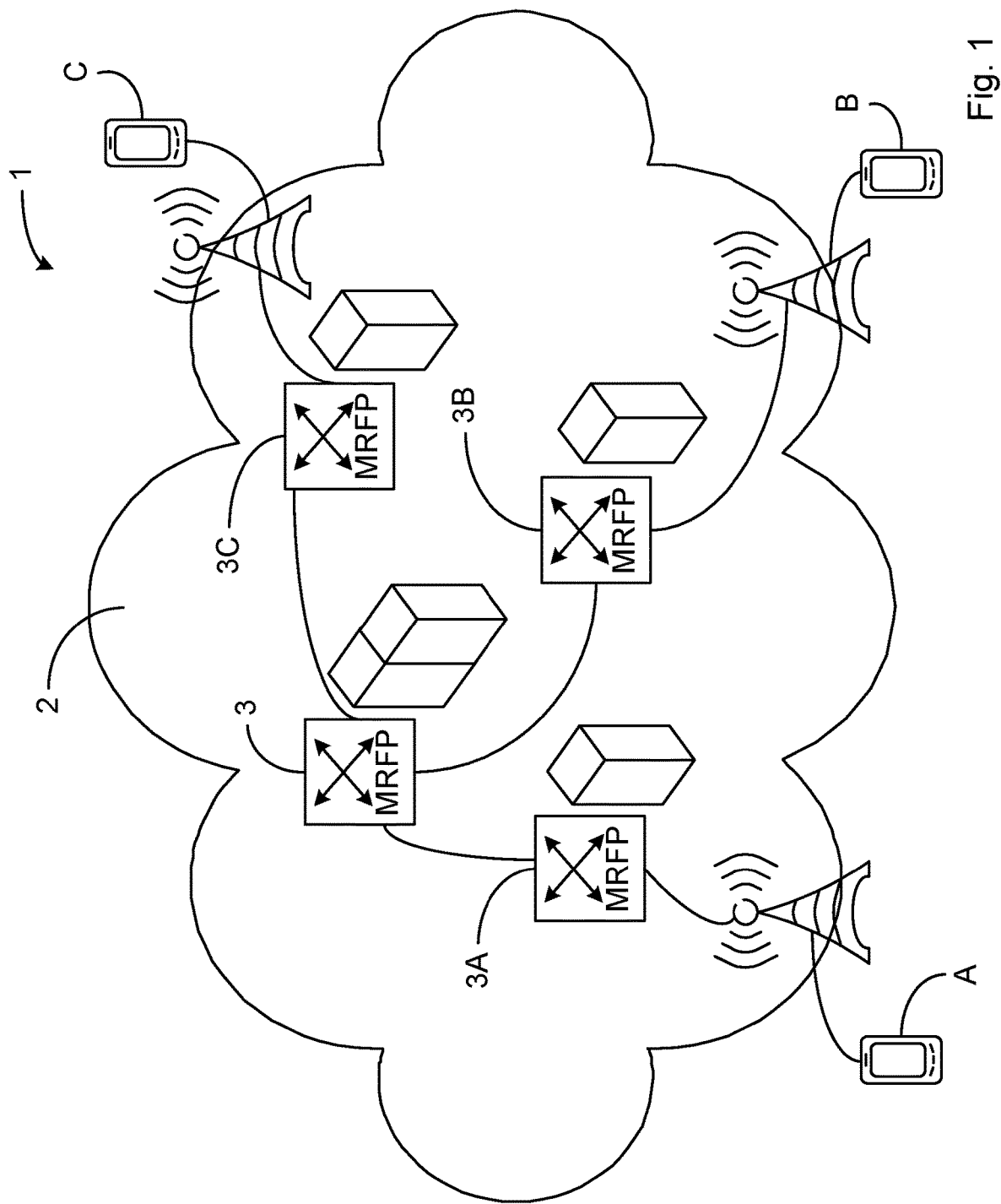
FIG. 1 illustrates a distributed cloud.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

In a distributed cloud environment, all the hardware in different sites of the network can be seen as becoming virtualized. This hardware includes nodes in the radio access network, edge routers, core network nodes, data centers, and so forth. Any one of these sites represents a location where virtual machines running media processing operations can be placed.

Briefly, the present teachings introduce multipath media stream redundancy for a distributed cloud. In the multipath media stream redundancy, media streams originating from and destined to a user are routed via multiple parallel paths across the distributed cloud. Every path through the distributed cloud network comprises a chain of virtual machines, each of which does a part of the media processing that the stream requires. In various embodiments, any virtual machine may fork a media stream before forwarding it, or stop some instances of the media stream if it is receiving multiple copies of the same stream. To increase robustness further, the responsibilities of any virtual machine in the chain can be replicated so that the same operation is done by two or more virtual machines in parallel. The forking and stopping of media streams, setting up of the chain, and the replication of responsibilities of virtual machines is coordinated by a controller node.

Figure 2:
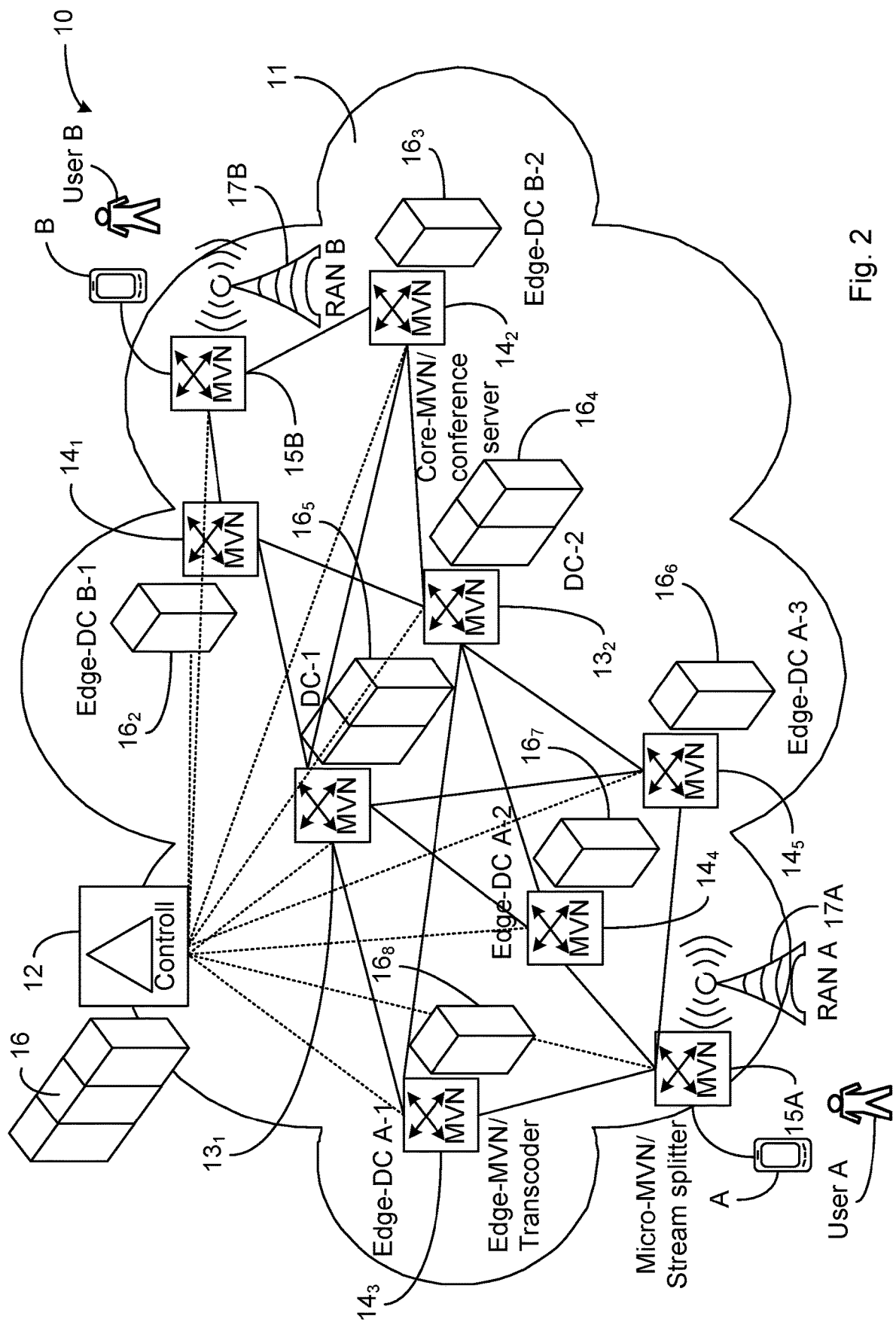
FIG. 2 illustrates a distributed cloud environment in which embodiments of the invention may be implemented.

FIG. 2 illustrates a distributed cloud environment 10 in which aspects of the present teachings may be implemented. In particular, the operation of multipath media stream redundancy of the present teachings will be described, in various aspects, for the distributed cloud environment 10. The distributed cloud environment 10 is in the following also denoted network 10. The network 10 comprises a distributed cloud 11, which in turn comprises a number of nodes. The nodes of the distributed cloud 11 will be described next.

A controller 12 can be seen as orchestrating all the distributed media processing resources in the distributed cloud 11. The distributed media processing resources are denoted Media Virtual Nodes (MVNs) $13_1$, $13_2$, $14_1$, $14_2$, $14_3$, $14_4$, $14_5$, 15A, 15B and may be differentiated into different types as will be described later. Each MVN runs on its own virtual machine. Each virtual machine, in turn, runs in one of the distributed data centers $16_1$, $16_2$, $16_3$, $16_4$, $16_5$, $16_6$, $16_7$, $16_8$. A virtual machine may be seen as a software implemented abstraction of the underlying hardware, which is presented to an application layer of the network. The virtual machine is thus a software implemented machine (computer) that executes programs like a physical machine.

The controller 12 is responsible for deciding inter alia where in the distributed cloud 11 to fork and stop media streams, how many copies of each media stream are sent across parallel paths, which path across the distributed cloud 11 each media stream takes, what the roles of different MVNs are, how the MVNs are placed in the distributed cloud 11, and to how many MVNs the same media processing operation is distributed. The operations carried out by the controller 12 will be described more in detail later, with reference to FIG. 3.

As mentioned, the MVNs maybe categorized into different types depending on e.g. their capability and/or location etc. The MVN may be categorized based on its capabilities e.g. in terms of CPU power, memory, storage capacity. As a particular example, the distributed cloud 11 may comprise a micro-MVN with little CPU power, a medium-MVN with a bit more CPU power and a large-MVN with plenty of CPU power. As another example, the MVN may be categorized based on its location, e.g. being an edge MVN, i.e. located close to the borders of the distributed cloud 11. It is noted that a core-MVN may correspond to an MVN categorized as a large-MVN with a high processing capacity, and an edge-MVN may correspond to an MVN categorized as a micro-MVN with less capacity; i.e. the combining different ways of categorizations. Yet further categorization is of course possible, e.g. based on cost of running an MVN in a particular data center. An operator may choose to run an MVN in a particular data center in view of cost efficiency, for example only running a micro-MVN in an expensive data center (expensive e.g. due to high priced CPU power) and running a core-MVN in a less expensive data center. There are three types of MVN represented in FIG. 2:

micro-MVN 15A, 15B; edge-MVN 14$_1$, 14$_2$, 14$_3$, 14$_4$, 14$_5$; and core-MVN 13$_1$, 13$_2$, which are described next.

A micro-MVN is an MVN which runs on a relatively constrained virtual machine. For example, and as illustrated in FIG. 2, a micro-MVN 15A, 15B is running in a base station 17A, 17B in a Radio Access Network (RAN), RAN A, RAN B. Since the capacity of the micro-MVN 15A, 15B is restricted, e.g. in terms of processing capacity, it can only perform limited and relatively inexpensive operations to the media streams that it processes.

In the FIG. 2, the micro-MVNs 15A, 15B are configured to perform media stream forking and media stream stopping. In stream forking, the micro-MVN 15A, 15B forks the media stream by copying each packet of the media stream and sending it to multiple next hop MVNs. In the particular example illustrated in FIG. 2, the next-hop MVNs for the micro-MVN 15A comprises the edge-MVNs 14$_3$, 14$_4$, 14$_5$, and the next-hop MVNs for the micro-MVN 15B comprises the edge-MVNs 14$_1$, 14$_2$. The controller 12 has previously indicated to the micro-MVN which these next hop MVNs are. A micro-MVN 15A, 15B serving a given user A, user B (using a respective user device A and user device B) also receives multiple copies of the same media stream destined from the network 10 towards the user A, user B. In media stream stopping, the micro-MVN 15A, 15B chooses only one media stream, typically the one resulting in the highest quality of experience, for transmission towards the user device A, B using the access networks RANA, RAN B, respectively. Other copies of the stream are stopped at the micro-MVN 15A, 15B, i.e. not forwarded further in the network 10. It is however noted that the micro-MVN 15A, 15B may alternatively be configured in other ways, for example configured to stop one media stream, typically the one with the worst quality, and forward all other media streams.

An edge-MVN 14$_1$, 14$_2$, 14$_3$, 14$_4$, 14$_5$ is typically located close to the edge of the network 10. An edge-MVN 14$_1$, 14$_2$, 14$_3$, 14$_4$, 14$_5$ has sufficient capacity to perform media processing for one or a few users A, B. The media processing operations that an edge-MVN 14$_1$, 14$_2$, 14$_3$, 14$_4$, 14$_5$ performs may for example comprise video bitrate adaptation, audio or video transcoding, audio and video decryption, video transrating, and so forth. The controller 12 may configure the edge-MVN 14$_1$, 14$_2$, 14$_3$, 14$_4$, 14$_5$ to split the media streams that it outputs to multiple next hop core-MVNs, which in this example comprises core-MVNs 13$_1$, 13$_2$. Similar to a micro-MVN 15A, 15B, an edge-MVN 14$_1$, 14$_2$, 14$_3$, 14$_4$, 14$_5$ can also stop media streams if it is receiving multiple copies of the same media stream due to forking at upstream MVNs. Upstream is the direction of the media stream from a transmitting user to a MVN and further through the network 10 to the receiving user, and downstream is the direction of the media stream to the user from a MVN (and at the other end from the other participating user, i.e. from the user transmitting data).

A core-MVN 13$_1$, 13$_2$ runs in a virtual machine that has sufficient capacity to carry out operations such as audio mixing and video switching, and even video mixing for multiple media streams. The core-MVN 13$_1$, 13$_2$ receives multiple copies of each user's media stream(s). From among these multiple copies, it selects the media stream which results in the highest quality, e.g. in terms of lowest delay, lowest jitter, and/or lowest packet loss. Only the selected media stream is processed further; the non-selected media streams are stopped. Further processing typically includes adding the selected media stream to the conference mix if the media stream is an audio stream, or switching a video stream to the rest of the conference participants if the video stream is from the active user (i.e. active speaker). The core-MVN 13$_1$, 13$_2$ splits its output stream to multiple next-hop MVNs that the controller 12 has indicated to it. The next-hop MVNs for the core-MVN 13$_1$, 13$_2$ in the illustrated case comprises the edge-MVNs 14$_1$, 14$_2$, 14$_3$, 14$_4$, 14$_5$.

It is noted that other set-ups than the one illustrated in FIG. 2 are possible. For example, a next-hop MVN for a core-MVN need not be an edge-MVN, but could alternatively be a micro-MVN or another core-MVN. It is also noted that the distributed cloud 11 may comprise a larger or fewer number of each respective node.

In various embodiments, and wherein a RAN is involved, the forking in the RANs (e.g. RAN A, RAN B of FIG. 2) can alternatively be done in hardware instead of in a virtual machine. The added delay and jitter is reduced or even minimized in such embodiments.

In other embodiments, instead of merely stopping the copies of the multipath media streams that are not selected for inclusion to a media service (such as a conference mix) or not selected for forwarding, an MVN may choose to merge the multipath media streams if such merging can result in improved quality. One example of such merging is replacing lost Real-Time Protocol (RTP) packets in the selected media stream with packets from the other copies of the same media stream.

In still other embodiments, if a user terminal is multi-homed, e.g., has both a 3G and Wi-Fi network interface, and if it is configured to send its media streams in parallel over multiple interfaces, a micro-MVN acting as a media stream splitter can receive multiple copies of the same media stream already from the user device (as opposed to from another MVN or a single RAN node). In this case, the micro-MVN can be configured to select only one of the media streams for forwarding to the next hop edge-MVN. The selected media stream is then preferably the one with the best quality, in some sense, e.g. lowest delay. In this regard it is noted that the controller 12 might be able to also configure the user devices in some scenarios, e.g. by configuring it to send its media streams in parallel as described.

In yet other embodiments, if the media service, e.g. the conference, is using multiple media streams, for example one audio stream and one video stream, an MVN performing forking can send the audio and video streams across different paths in the distributed cloud network 10. This might be advantageous for instance in scenarios in which some of the virtual machines in the chain of virtual machines that the path represents are under heavy load and only have capacity to process and forward the audio stream. In particular, if video and audio are sent along the same path they compete for the same resources. If the video and audio streams instead are sent along different paths, then in case of failure of e.g. a data center through which the audio stream is configured to travel, the user will still have chances of obtaining the video stream and thus not completely drop out of the conference.

It is also noted that the media streams that a given user receives may take a different path across the distributed cloud 11 than the media streams that the same user sends.

Still further, it is noted that the media streams need not be identical, depending e.g. on type of video encoding (which could thus be different, resulting in non-identical treatment of the same media stream).

Figure 3:
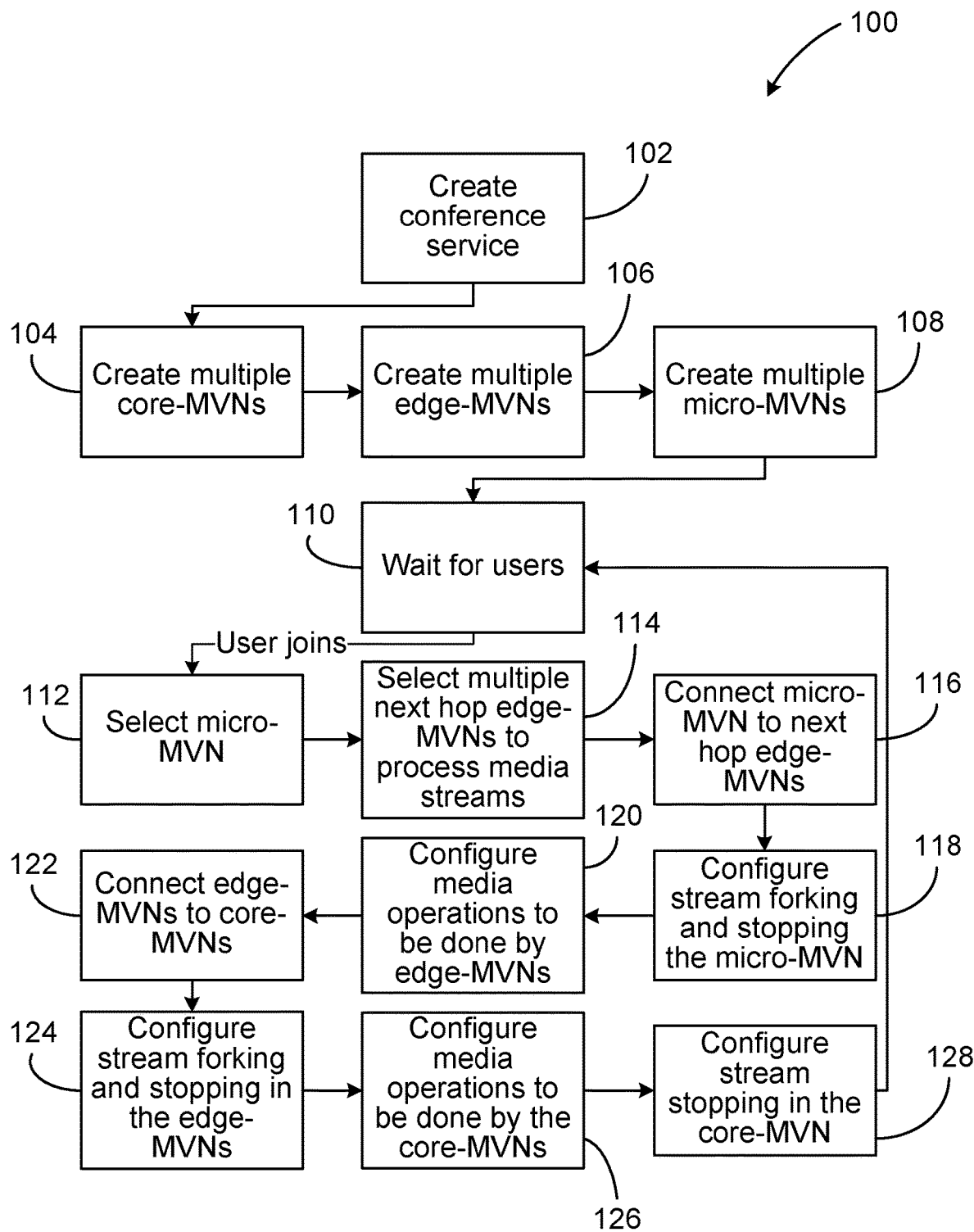
FIG. 3 is a flow chart illustrating operations performed in a network node in accordance with the present teachings.

FIG. 3 is a flow chart 100 illustrating operations performed in a network node in accordance with the present teachings. With reference now to the flow chart 100 of FIG. 3, operations performed in the network node, and in particular the controller 12, will be described next. The controller 12 receives a request for a conference service, e.g. from one of the users, and then creates (box 102) a conference service. Based on this request, it creates (boxes 104, 106, 108) multiple core-MVNs, multiple edge-MVNs and multiple micro-MVNs, which MVNs are to take care of the conference service. In this creation of MVNs, it is noted that all the MVNs are not necessarily created at once. There might be more MVNs added in appropriate locations when new users join the conference. Correspondingly, old MVNs may be removed when users leave. The controller 12 might also choose to add more MVNs to improve the quality of the conference if it determines that the quality of the existing redundant streams is not good enough. Further, when the controller 12 creates the MVNs, it might utilize historical information (e.g., data stored during previous conferences that the same user has initiated) when selecting where to create the MVNs and how many and what types of MVNs to create. Finally, the user initiating the conference might also provide some information about the conference (e.g., expected number of participants and their locations) to the controller 12, which may then be configured to utilize such information when deciding where to create MVNs and how many and what types of MVNs to create.

Next, at box 110, when the paths have been created, the controller 12 awaits the users to call in to the conference. When a user joins, the controller 12 selects (box 112) a micro-MVN, and selects (box 114) one or more next hop edge-MVNs to process the media streams of the requested conference service. In this selection (112, 114) of MVNs, the controller 12 may take into consideration factors such as availability and capacity of the data centers in which the MVNs are to be located, closeness to the users (in particular when selecting an edge-MVN) etc.

Next, at box 116, the controller 12 connects the selected micro-MVN to the next hop edge-MVNs.

Next, at box 118, the controller 12 configures the micro-MVN in view of stream forking and stopping. This configuration may be done in view of e.g. the capacity (e.g. processing capacity) of the micro-MVN.

Next, at box 120, the controller 12 configures the media operations to be done by the edge-MVNs. It is noted that the edge-MVNs need not to be identically configured, but that the configuration of a particular edge-MVN may depend on its capacity, availability etc.

Next, at box 122, the controller 12 connects the edge-MVN to the previously created core-MVNs.

Next, at box 124, the controller 12 configures the stream forking and stopping in the edge-MVNs. Different criteria might be configured for stream stopping. A few examples comprise: "only forward the stream with the lowest delay", "only forward the stream with the lowest packet loss", "only forward the stream with the lowest jitter", "merge streams to recover from packet loss", etc.

Next, at box 126, the controller 12 configures the media operations to be done by the core-MVNs. The media operations may for example include conference mixing, conference switching, media recording, speech recognition, speech-to-text translation, real-time translation, speech synthesis, etc.

Finally, at box 128, the controller 12 configures stream stopping in the core-MVNs. The controller 12 may configure the stream stopping based on the criteria mentioned for the stream stopping configuration of the edge-MVNs; i.e. "only forward the stream with the lowest delay", "only forward the stream with the lowest packet loss", "only forward the stream with the lowest jitter", "merge streams to recover from packet loss", etc.

Then, the flow returns to box 110, awaiting an additional user to join the conference. The flow then repeats the above tasks (configuring and connecting) as described in relation to boxes 112 through 128. This is repeated until all participants have joined.

During the ongoing conference, i.e. during the communication session, the controller 12 may reconfigure the MVNs dynamically. It may for example remove or replace some MVNs, or reconfigure the configured stream forking of a particular MVN etc.

In the exemplary layout illustrated in FIG. 2, there are two core-MVNs $13_1$, $13_2$. The controller 12 can configure a video conference to use multiple core-MVNs (which in the illustrated example act as conference servers) for the sake of redundancy. In this case, each conference server carries out switching and mixing independently. Each conference server also forwards its output to multiple next hop edge-MVNs following the configuration set by the controller 12. Thus, the next hop edge-MVNs receive multiple copies of the conference audio mix and switched/mixed video, and can select the one of these with the best quality for forwarding towards the micro-MVN(s).

Figure 4:
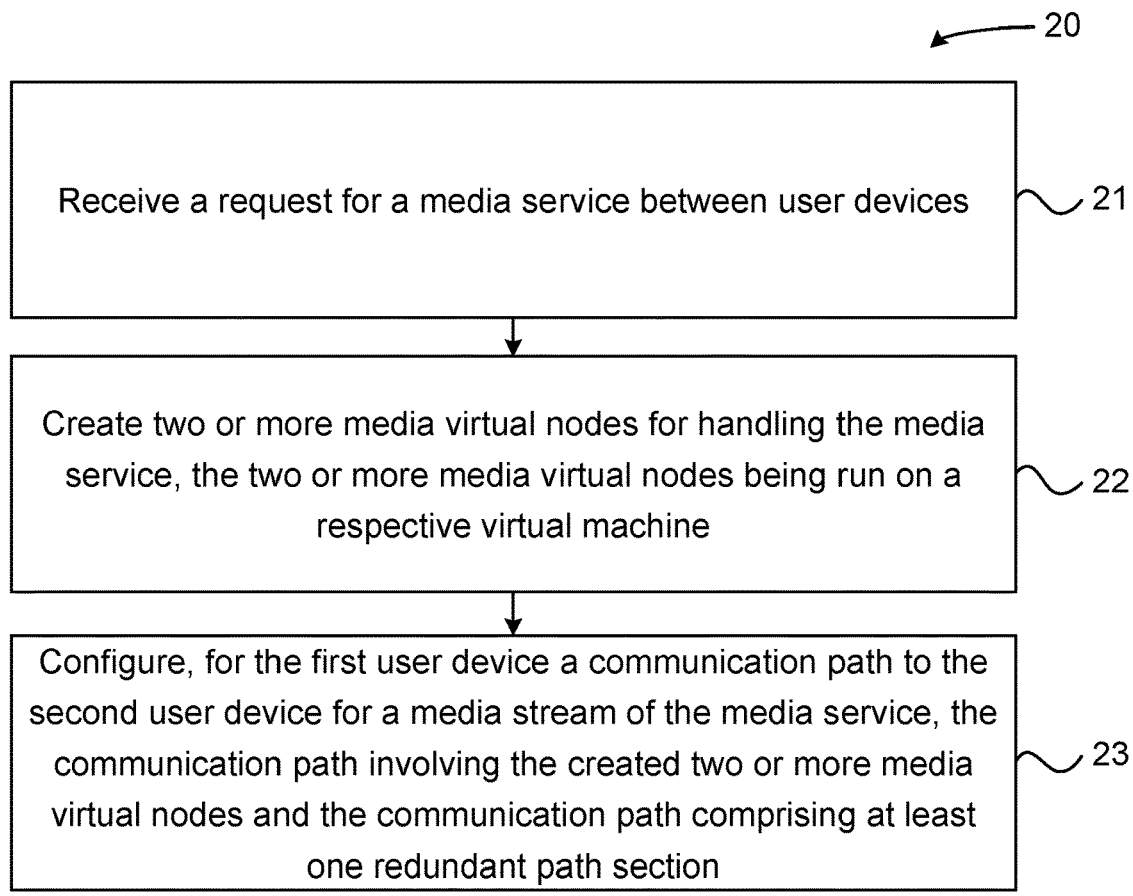
FIG. 4 is a flow chart over steps of a method in a network node in accordance with the present teachings.

FIG. 4 is a flow chart over steps of a method 20 in a network node in accordance with the present teachings. The method 20 for media processing is performed in a network node 12 of a distributed cloud 11, such as the distributed cloud 11 described with reference to e.g. FIG. 2. The distributed cloud 11 comprises two or more virtual machines run in a respective distributed data center $16_1$, $16_2$, $16_3$, $16_4$, $16_5$, $16_6$, $16_7$, $16_8$.

The method 20 comprises receiving 21 a request for a media service between at least a first and a second user device A, B.

The method 20 comprises creating 22 two or more media virtual nodes 15A, 15B; $14_1$, $14_2$, $14_3$, $14_4$, $14_5$; $13_1$, $13_2$ for handling the media service, the two or more media virtual nodes 15A, 15B; $14_1$, $14_2$, $14_3$, $14_4$, $14_5$; $13_1$, $13_2$ being run on a respective virtual machine. The distributed cloud 11 thus comprises two or more virtual machines run in a respective distributed data center $16_1$, $16_2$, $16_3$, $16_4$, $16_5$, $16_6$, $16_7$, $16_8$. It is noted that the present teachings also anticipates two or more virtual machines run in a single first data center, and a third virtual machine run in a different, second data center. That is, the distributed cloud 11, when comprising only two virtual machines, then they are run on a respective distributed data center, and if there are more virtual machines, they may be run on the same data center as the two first virtual machines or on still another data center. In this regards, it is also noted that "data center" encompasses a single computing device as well as large number of computing devices.

The method 20 comprises configuring 23, for the first user device A participating in the media service, a communication path to the second user device B for a media stream of the media service. The communication path involves the created two or more media virtual nodes 15A, 15B; $14_1$, $14_2$, $14_3$, $14_4$, $14_5$; $13_1$, $13_2$ and the communication path comprises at least one redundant path section.

In an embodiment, the redundant path section comprises one of at least two parallel paths sections originating from any one of the media virtual nodes 15A, 15B; $14_1$, $14_2$, $14_3$, $14_4$, $14_5$; $13_1$, $13_2$. That is, data packets from one media virtual node are sent along two or more parallel paths, and in particular sent to two different receiving media virtual nodes.

In an embodiment, the configuring 23 further comprises configuring each of the two or more media virtual nodes 15A, 15B; $14_1$, $14_2$, $14_3$, $14_4$, $14_5$; $13_1$, $13_2$ with configuration information regarding one or more of: forking of a media stream, stopping of a media stream, number of copies of a media stream to send across parallel path sections, selection of path across the distributed cloud 11 for a media stream, functioning role of the two or more media virtual nodes 15A, 15B; $14_1$, $14_2$, $14_3$, $14_4$, $14_5$; $13_1$, $13_2$, placement of the two or more media virtual nodes 15A, 15B; $14_1$, $14_2$, $14_3$, $14_4$, $14_5$; $13_1$, $13_2$ in the distributed cloud 11, and number of media virtual nodes 15A, 15B; $14_1$, $14_2$, $14_3$, $14_4$, $14_5$; $13_1$, $13_2$ to which a same media processing operation is distributed.

In an embodiment, the configuring 23 of a communication path comprises configuring the communication path between the at least two user devices A, B based on one or more of: average delay, latency between different possible communication paths, packet losses, jitter, availability of a respective distributed data center $16_1$, $16_2$, $16_3$, $16_4$, $16_5$, $16_6$, $16_7$, $16_8$, and load of a respective distributed data center $16_1$, $16_2$, $16_3$, $16_4$, $16_5$, $16_6$, $16_7$, $16_8$. Different parameters can thus be used depending on the particular case at hand, e.g. depending on the requirements of the operator of a network comprising the distributed cloud, or on user expectations etc.

In an embodiment, the configuring 23 of a communication path comprises configuring the communication path between the at least two user devices A, B having the lowest latency, the lowest jitter, and/or the lowest packet losses. Optimizing the communication path in view of such parameters gives the highest possible quality to the requested media service, which may for example comprise a real-time video conference.

In an embodiment, the creating 22 of the two or more media virtual nodes 15A, 15B; $14_1$, $14_2$, $14_3$, $14_4$, $14_5$; $13_1$, $13_2$ comprises creating at least one core media virtual node $13_1$, $13_2$ handling switching and/or mixing of the media stream of the media service.

In an embodiment, the creating 22 of the two or more media virtual nodes 15A, 15B; $14_1$, $14_2$, $14_3$, $14_4$, $14_5$; $13_1$, $13_2$ comprises creating at least one micro media virtual node 15A, 15B running in a node 17A, 17B of a radio access network and handling media stream forking and/or media stream stopping.

A variation of the above embodiment comprises configuring, in the network node 12, the micro media virtual node 15A, 15B to fork the media stream by copying each data packet of the media stream and sending it to two or more next-hop media virtual nodes $14_1$, $14_2$, $14_3$, $14_4$, $14_5$; $13_1$, $13_2$. Another variation of the above embodiment comprises configuring, in the network node 12, the micro media virtual node 15A, 15B to stop a media stream based on a quality parameter. That is, a media stream having a quality below a quality parameter is stopped. Equivalently, only media streams having a quality above a quality parameter are forked and sent forward.

In an embodiment, the creating 22 of the two or more media virtual nodes 15A, 15B; $14_1$, $14_2$, $14_3$, $14_4$, $14_5$; $13_1$, $13_2$ comprises creating at least one edge media virtual node $14_1$, $14_2$, $14_3$, $14_4$, $14_5$ handling media processing, the media processing comprising one or more of: video bitrate adaptation, audio or video transcoding, audio and video decryption, and video transrating.

A variation of the above embodiment comprises configuring, in the network node 12, the edge media virtual node $14_1$, $14_2$, $14_3$, $14_4$, $14_5$ to split a media stream and outputting the split media stream to and sending it to two or more next-hop media virtual nodes $14_1$, $14_2$, $14_3$, $14_4$, $14_5$; $13_1$, $13_2$.

In an embodiment, the edge media virtual node $14_1$, $14_2$, $14_3$, $14_4$, $14_5$ is run on a virtual machine, wherein the virtual machine is run in a distributed data center $16_1$, $16_2$, $16_3$, $16_4$, $16_5$, $16_6$, $16_7$, $16_8$ of the distributed cloud 11 located closest to the user device A, B. Closeness to the user of the media virtual node provides the advantage of enabling minimized latencies and maximized responsiveness. High responsiveness can e.g. be exemplified by the ability to adapt the media streams being sent towards the user using feedback from the local radio access network, for the case the user is participating in the media service using a wireless device.

In an embodiment, the configuring 23 is performed repeatedly or continuously during the duration of the media service, whereby the communication path for the media stream of the media service is reconfigured dynamically. The network node 12 typically gathers statistics from and about the various nodes within the network 10 comprising the distributed cloud 11. Such statistics, e.g. latencies occurring on particular path sections, failure messages etc. may be updated continuously and based thereon the network node 12 may determine that a reconfiguration of e.g. the communication paths would be beneficial, e.g. in that the quality of the media service would increase.

In an embodiment, the media processing comprises real-time communication and the media service comprises a real-time communication session between two or more user devices A, B, in particular a video conference or an audio conference.

In an embodiment, the configuring 23 of a communication path for a media stream of the media service is repeated for each user device A, B participating in the media service and to each other user device A, B.

It is noted that the various embodiments may be combined in other ways than the above indicated.

Figure 5:
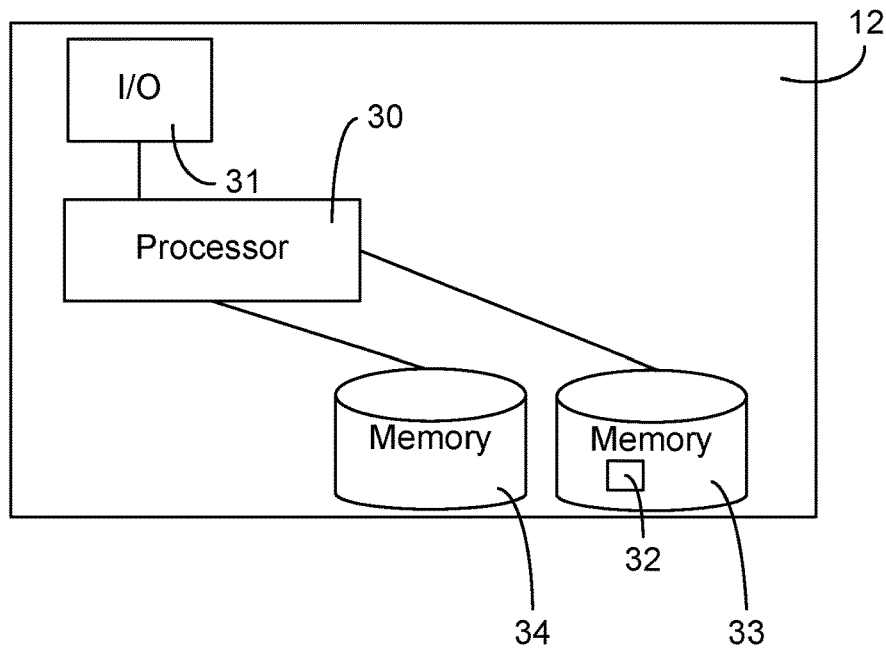
FIG. 5 illustrates schematically a network node and means for implementing methods in accordance with the present teachings.

FIG. 5 illustrates schematically a network node and means for implementing methods in accordance with the present teachings. The network node 12 comprises a processor 30 comprising any combination of one or more of a central processing unit (CPU), multiprocessor, microcontroller, digital signal processor (DSP), application specific integrated circuit etc. capable of executing software instructions stored in a memory 33, which can thus be a computer program product. The processor 30 can be configured to execute any of the various embodiments of the method 20 as described in relation to FIG. 4.

In particular, the network node 12 for media processing is provided. The network node 12 is part of a distributed cloud 11 comprising two or more virtual machines run in a respective distributed data center $16_1$, $16_2$, $16_3$, $16_4$, $16_5$, $16_6$, $16_7$, $16_8$. The network node 12 comprises the above mentioned processor 30 and memory 33. The memory 33 contains instructions executable by the processor 30, whereby the network node 12 is operative to:

receive a request for a media service between at least a first and a second user devices A, B,
 create two or more media virtual nodes 15A, 15B; $14_1$, $14_2$, $14_3$, $14_4$, $14_5$; $13_1$, $13_2$ for handling the media service, the two or more media virtual nodes 15A, 15B; $14_1$, $14_2$, $14_3$, $14_4$, $14_5$; $13_1$, $13_2$ being run on a respective virtual machine, and configure, for the first user device A participating in the media service, a communication path to the second user device B for a media stream of the media service, the communication path involving the created two or more media virtual nodes 15A, 15B; $14_1$, $14_2$, $14_3$, $14_4$, $14_5$; $13_1$, $13_2$ and the communication path comprising at least one redundant path section.

In an embodiment, the redundant path section comprises one of at least two parallel paths sections originating from any one of the media virtual nodes 15A, 15B; $14_1$, $14_2$, $14_3$, $14_4$, $14_5$; $13_1$, $13_2$.

In an embodiment, the configuring further comprises configuring each of the two or more media virtual nodes 15A, 15B; $14_1$, $14_2$, $14_3$, $14_4$, $14_5$; $13_1$, $13_2$ with configuration information regarding one or more of: forking of a media stream, stopping of a media stream, number of copies of a media stream to send across parallel path sections, selection of path across the distributed cloud 11 for a media stream, functioning role of the two or more media virtual nodes 15A, 15B; $14_1$, $14_2$, $14_3$, $14_4$, $14_5$; $13_1$, $13_2$, placement of the two or more media virtual nodes 15A, 15B; $14_1$, $14_2$, $14_3$, $14_4$, $14_5$; $13_1$, $13_2$ in the distributed cloud 11, and number of media virtual nodes 15A, 15B; $14_1$, $14_2$, $14_3$, $14_4$, $14_5$; $13_1$, $13_2$ to which a same media processing operation is distributed.

In an embodiment, the configuring of a communication path, comprises configuring the communication path between the at least two user devices A, B based on one or more of: average delay, latency between different possible communication paths, packet losses, jitter, availability of a respective distributed data center $16_1$, $16_2$, $16_3$, $16_4$, $16_5$, $16_6$, $16_7$, $16_8$, and load of a respective distributed data center $16_1$, $16_2$, $16_3$, $16_4$, $16_5$, $16_6$, $16_7$, $16_8$.

In an embodiment, the configuring of a communication path comprises configuring the communication path between the at least two user devices A, B having the lowest latency, the lowest jitter, and/or the lowest packet losses.

In an embodiment, the creating of the two or more media virtual nodes 15A, 15B; $14_1$, $14_2$, $14_3$, $14_4$, $14_5$; $13_1$, $13_2$ comprises creating at least one core media virtual node $13_1$, $13_2$ handling switching and/or mixing of the media stream of the media service.

In an embodiment, the creating of the two or more media virtual nodes 15A, 15B; $14_1$, $14_2$, $14_3$, $14_4$, $14_5$; $13_1$, $13_2$ comprises creating at least one micro media virtual node 15A, 15B running in a node 17A, 17B of a radio access network and handling media stream forking and/or media stream stopping.

In a variation of the above embodiment, the network node 12 is arranged to configure the micro media virtual node 15A, 15B to fork the media stream by copying each data packet of the media stream and sending it to two or more next-hop media virtual nodes $14_1$, $14_2$, $14_3$, $14_4$, $14_5$; $13_1$, $13_2$. In another variation of the above embodiment, the network node 12 is arranged to configure the micro media virtual node 15A, 15B to stop a media stream based on a quality parameter.

In an embodiment, the creating of the two or more media virtual nodes 15A, 15B; $14_1$, $14_2$, $14_3$, $14_4$, $14_5$; $13_1$, $13_2$ comprises creating at least one edge media virtual node $14_1$, $14_2$, $14_3$, $14_4$, $14_5$ handling media processing, the media processing comprising one or more of: video bitrate adaptation, audio or video transcoding, audio and video decryption, and video transrating.

In a variation of the above embodiment, the network node 12 is arranged to configure the edge media virtual node $14_1$, $14_2$, $14_3$, $14_4$, $14_5$ to split a media stream and outputting the split media stream to and sending it to two or more next-hop media virtual nodes $14_1$, $14_2$, $14_3$, $14_4$, $14_5$; $13_1$, $13_2$.

In an embodiment, the edge media virtual node $14_1$, $14_2$, $14_3$, $14_4$, $14_5$ is run on a virtual machine, wherein the virtual machine is run in a distributed data center $16_1$, $16_2$, $16_3$, $16_4$, $16_5$, $16_6$, $16_7$, $16_8$ of the distributed cloud 11 located closest to the user device A, B.

In an embodiment, the network node 12 is arranged to perform the configuring repeatedly or continuously during the duration of the media service, whereby the communication path for the media stream of the media service is reconfigured dynamically.

Still with reference to FIG. 5, the memory 33 can be any combination of read and write memory (RAM) and read only memory (ROM). The memory 32 also comprises persistent storage, which, for example, can be any single one or combination of magnetic memory, optical memory, solid state memory or even remotely mounted memory.

A data memory 34 may also be provided for reading and/or storing data during execution of software instructions in the processor 30. The data memory 34 can be any combination of read and write memory (RAM) and read only memory (ROM).

The network node 12 further comprises an input/output (I/O) device 31 operatively connected to the processor 30. The I/O device 31 is configured to receive/transmit data from/to other network nodes possibly using other intermediate devices, e.g. antennas. The I/O device 31 is configured to communicate with other network nodes through wired or wireless connections. Although illustrated in the FIG. 5 as a single unit, the I/O device 31 may alternatively comprise several units, and it may be implemented in hardware and/or software.

The present teachings also encompass computer program 32 for a network node 12 of a distributed cloud 11 comprising two or more virtual machines run in a respective distributed data center. The computer program 32 comprises computer program code, which, when run on the network node 12 causes the network node 12 to perform any of the described embodiments of the method 20. In particular, causes the network node 12 to:

receive a request for a media service between at least a first and a second user device A, B, create two or more media virtual nodes 15A, 15B; $14_1$, $14_2$, $14_3$, $14_4$, $14_5$; $13_1$, $13_2$ for handling the media service, the two or more media virtual nodes 15A, 15B; $14_1$, $14_2$, $14_3$, $14_4$, $14_5$; $13_1$, $13_2$ being run on a respective virtual machine, and configure, for the first user device A participating in the media service, a communication path to the second user device B for a media stream of the media service, the communication path involving the created two or more media virtual nodes 15A, 15B; $14_1$, $14_2$, $14_3$, $14_4$, $14_5$; $13_1$, $13_2$ and the communication path comprising at least one redundant path section.

The teachings of the present application also encompasses such computer program product 33 comprising a computer program 32 as described above, and a computer readable means on which the computer program 32 is stored. The computer program product 33 may be any combination of read and write memory (RAM) or read only memory (ROM). The computer program product 33 may also comprise persistent storage, which for example can be any single one or combination of magnetic memory, optical memory or solid state memory.

The computer program product 33, or the memory 33, thus comprises instructions executable by the processor 30.

Such instructions may be comprised in a computer program 32, or in one or more software modules or function modules.

Figure 6:
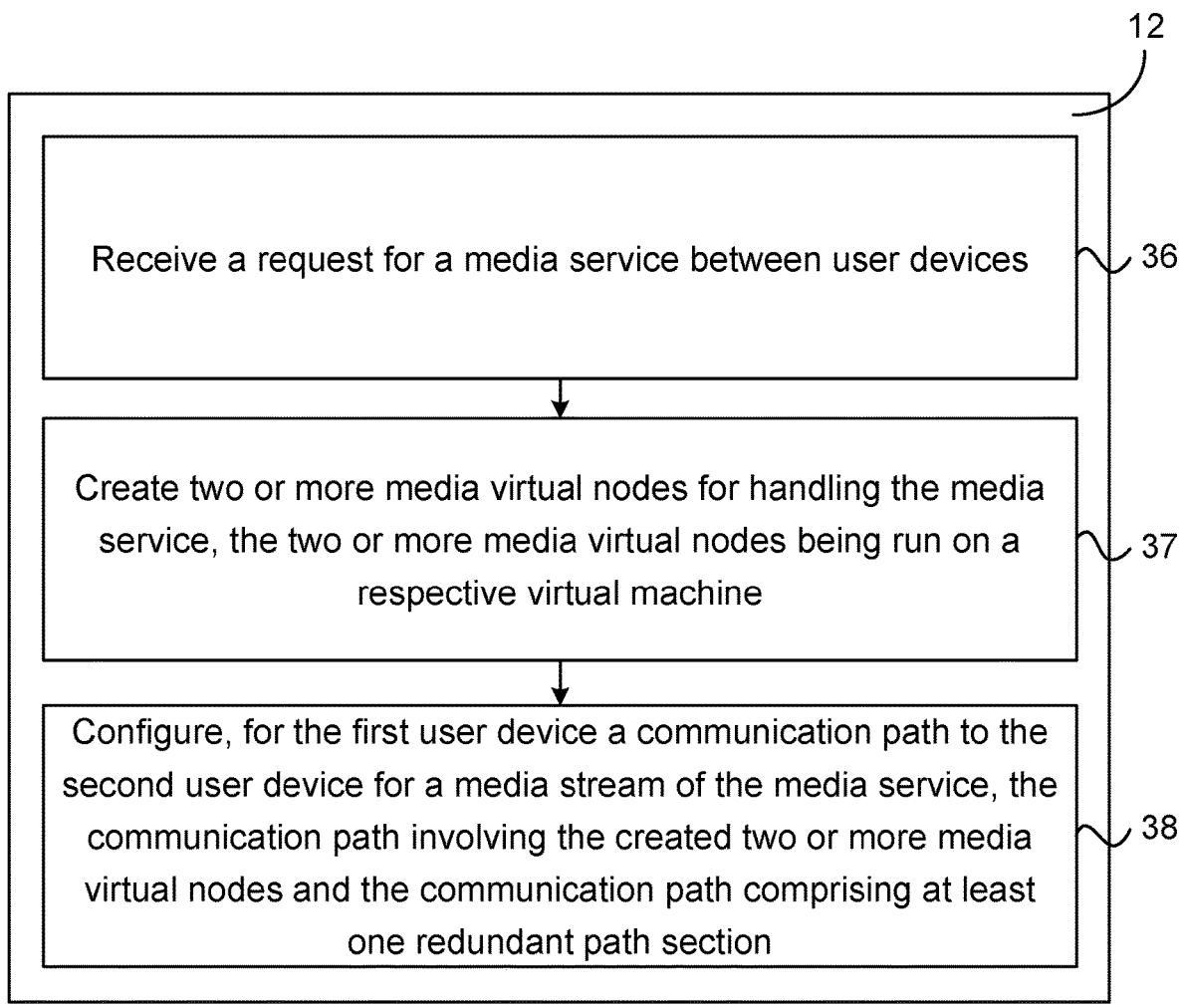
FIG. 6 illustrates a network node comprising functions modules/software modules for implementing methods in accordance with the present teachings.

FIG. 6 illustrates a network node comprising functions modules/software modules for implementing methods in accordance with the present teachings. The network node 12 comprises means 36, in particular a first function module 36, for receiving a request for a media service between at least a first and a second user device A, B. The network node 12 comprises means 37, in particular a second function module 37, for creating two or more media virtual nodes 15A, 15B; $14_1$, $14_2$, $14_3$, $14_4$, $14_5$; $13_1$, $13_2$ for handling the media service, the two or more media virtual nodes 15A, 15B; $14_1$, $14_2$, $14_3$, $14_4$, $14_5$; $13_1$, $13_2$ being run on a respective virtual machine. The network node 12 comprises means 38, in particular a third function module 38 for configuring, for the first user device A participating in the media service, a communication path to the second user device B for a media stream of the media service, the communication path involving the created two or more media virtual nodes 15A, 15B; $14_1$, $14_2$, $14_3$, $14_4$, $14_5$; $13_1$, $13_2$ and the communication path comprising at least one redundant path section.

The functions modules 36, 37, 38 can be implemented using software instructions such as computer program executing in a processor and/or using hardware, such as application specific integrated circuits, field programmable gate arrays, discrete logical components etc.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method for media processing performed in a network node of a distributed cloud comprising two or more virtual machines run in a respective distributed data center, the method comprising:
  receiving a request for a media service between at least a first and a second user device;
  creating two or more media virtual nodes for handling the media service, the two or more media virtual nodes being run on a respective virtual machine, wherein creating the two or more media virtual nodes comprises: creating at least one micro media virtual node running in a node of a radio access network and handling media stream forking and media stream stopping based on a quality parameter;
  configuring, for the first user device participating in the media service, a communication path to the second user device for a media stream of the media service, the communication path involving the created two or more media virtual nodes and the communication path comprising at least one redundant path section, wherein the configuring further comprises configuring each of the two or more media virtual nodes with configuration information regarding one or more of forking of a media stream, stopping of a media stream, and the number of copies of a media stream to send across parallel path sections.

2. The method as claimed in claim 1, wherein the at least one redundant path section comprises one of at least two parallel paths sections originating from any one of the media virtual nodes.

3. The method as claimed in claim 1, wherein the configuring of a communication path, comprises configuring the communication path between the at least two user devices based on one or more of: average delay, latency between different possible communication paths, packet losses, jitter, availability of a respective distributed data center, and load of a respective distributed data center.

4. The method as claimed in claim 1, wherein the configuring of a communication path, comprises configuring the communication path between one or more of:
  the at least two user devices having the lowest latency, the lowest jitter, and the lowest packet losses.

5. The method as claimed in claim 1, wherein the creating of the two or more media virtual nodes comprises:
  creating at least one core media virtual node handling switching and mixing of the media stream of the media service.

6. The method as claimed in claim 1, comprising configuring, in the network node, the micro media virtual node to fork the media stream by copying each data packet of the media stream and sending it to two or more next-hop media virtual nodes.

7. The method as claimed in claim 1, wherein the creating of the two or more media virtual nodes comprises creating at least one edge media virtual node handling media processing, the media processing comprising one or more of: video bitrate adaptation, audio or video transcoding, audio and video decryption, and video transrating.

8. The method as claimed in claim 7, comprising configuring, in the network node, the edge media virtual node to split a media stream and outputting the split media stream to and sending it to two or more next-hop media virtual nodes.

9. The method as claimed in claim 7, wherein the edge media virtual node is run on a virtual machine, wherein the virtual machine is run in a distributed data center of the distributed cloud located closest to the user device.

10. The method as claimed in claim 1, wherein the configuring is performed repeatedly or continuously during the duration of the media service, whereby the communication path for the media stream of the media service is reconfigured dynamically.

11. The method as claimed in claim 1, wherein the media processing comprises real-time communication and wherein the media service comprises a real-time communication session between two or more user devices, in particular a video conference or an audio conference.

12. The method as claimed in claim 1, wherein the configuring of a communication path for a media stream of the media service is repeated for each user device participating in the media service and to each other user device.

13. A network node for media processing of a distributed cloud comprising two or more virtual machines run in a respective distributed data center, the network node comprising a processor and a memory, the memory containing instructions executable by the processor, whereby the network node is operative to:
  receive a request for a media service between at least a first and a second user device;
  create two or more media virtual nodes for handling the media service, the two or more media virtual nodes being run on a respective virtual machine, wherein in creating the two or more media virtual nodes, the network node is operative to create at least one micro media virtual node running in a node of a radio access network and handling media stream forking and media stream stopping based on a quality parameter; and
  configure, for the first user device participating in the media service, a communication path to the second user device for a media stream of the media service, the communication path involving the created two or more media virtual nodes and the communication path comprising at least one redundant path section, wherein each of the two or more media virtual nodes are configured with configuration information regarding one or more of: forking of a media stream, stopping of a media stream, and the number of copies of a media stream to send across parallel path sections.

14. The network node as claimed in claim 13, wherein the redundant path section comprises one of at least two parallel paths sections originating from any one of the media virtual nodes.

15. The network node as claimed in claim 13, wherein the configuring of a communication path, comprises configuring the communication path between the at least two user devices based on one or more of: average delay, latency between different possible communication paths, packet losses, jitter, availability of a respective distributed data center, and load of a respective distributed data center.

16. The network node as claimed in claim 13, wherein the configuring of a communication path, comprises one or more of:
configuring the communication path between the at least two user devices having the lowest latency, the lowest jitter, and the lowest packet losses.

17. The network node as claimed in claim 13, wherein the creating of the two or more media virtual nodes comprises:
creating at least one core media virtual node handling switching and mixing of the media stream of the media service.

18. The network node as claimed in claim 13, wherein the micro media virtual node is configured to fork the media stream by copying each data packet of the media stream and sending it to two or more next-hop media virtual nodes.

19. The network node as claimed in claim 13, wherein the creating of the two or more media virtual nodes comprises creating at least one edge media virtual node handling media processing, the media processing comprising one or more of: video bitrate adaptation, audio or video transcoding, audio and video decryption, and video transrating.

20. The network node as claimed in claim 19, wherein the edge media virtual node is configured to split a media stream and outputting the split media stream to and sending it to two or more next-hop media virtual nodes.

21. The network node as claimed in claim 19, wherein the edge media virtual node is run on a virtual machine, wherein the virtual machine is run in a distributed data center of the distributed cloud located closest to the user device.

22. The network node as claimed in claim 13, wherein the configuring is performed repeatedly or continuously during the duration of the media service, whereby the communication path for the media stream of the media service is reconfigured dynamically.

23. A computer program product for a network node of a distributed cloud comprising two or more virtual machines run in a respective distributed data center, the computer program product comprising computer program code read on a non-transitory computer readable medium, which, when run on the network node causes the network node to:
receive a request for a media service between at least a first and a second user device;
create two or more media virtual nodes for handling the media service, the two or more media virtual nodes being run on a respective virtual machine, wherein in creating the two or more media virtual nodes, the network node is operative to create at least one micro media virtual node running in a node of a radio access network and handling media stream forking and media stream stopping based on a quality parameter; and
configure, for the first user device participating in the media service, a communication path to the second user device for a media stream of the media service, the communication path involving the created two or more media virtual nodes and the communication path comprising at least one redundant path section, wherein each of the two or more media virtual nodes are configured with configuration information regarding one or more of: forking of a media stream, stopping of a media stream, and the number of copies of a media stream to send across parallel path sections.

24. The method as claimed in claim 1, wherein the configuring further comprises configuring each of the two or more media virtual nodes with configuration information regarding one or more of: selection of path across the distributed cloud for a media stream, functioning role of the two or more media virtual nodes, placement of the two or more media virtual nodes in the distributed cloud, and number of media virtual nodes to which a same media processing operation is distributed.

25. The network node as claimed in claim 13, wherein the configuring further comprises configuring each of the two or more media virtual nodes with configuration information regarding one or more of: selection of path across the distributed cloud for a media stream, functioning role of the two or more media virtual nodes, placement of the two or more media virtual nodes in the distributed cloud, and number of media virtual nodes to which a same media processing operation is distributed.

* * * * *